Figure 1:
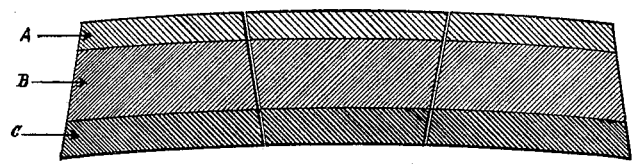

(No Model.)

J. H. AMIES.
PAVEMENT OF PLASTIC COMPOSITION.

No. 530,077. Patented Dec. 4, 1894.

WITNESS.
Alfred Darroch
J. A. W. Wilson.

INVENTOR.
Jos. H. Amies
per J. U. Robertson,
attorney.

THE NORRIS PETERS CO., PHOTO-LITHO., WASHINGTON, D. C.

UNITED STATES PATENT OFFICE.

JOSEPH H. AMIES, OF PHILADELPHIA, PENNSYLVANIA, ASSIGNOR TO THE AMIES PAVEMENT COMPANY, OF CAMDEN, NEW JERSEY.

PAVEMENT OF PLASTIC COMPOSITION.

SPECIFICATION forming part of Letters Patent No. 530,077, dated December 4, 1894.

Application filed May 8, 1893. Serial No. 473,431. (No specimens.)

*To all whom it may concern:*

Be it known that I, JOSEPH H. AMIES, a citizen of the United States, residing in the city of Philadelphia, in the county of Philadelphia and State of Pennsylvania, have invented new and useful Improvements in Pavements Composed of Plastic Compositions, of which the following is a specification.

My invention has for its object the construction of road-beds out of a composition of materials, which is new, laid down in the manner illustrated in the drawings and explained in the following specification.

I have at the present time an application for a patent on file at the United States Patent Office, bearing the Serial No. 456,730, and dated December 29, 1892, for a plastic composition useful for pavement and road-making. This invention consists of improvements in and additions to said plastic composition.

In compounding my improved plastic composition I first take "kidney-oil," rosin, and "soft pitch," preferably of the following proportions, namely: "kidney oil" one sixth part, rosin two sixths parts, and "soft pitch" three sixths parts, and boil them together in a proper vessel. These proportions will vary more or less according to the consistency of the "kidney oil" which varies greatly at times. The right proportions may be arrived at by making a test in the following manner: Take a small quantity of the material boiled down in the proportions named and place it upon a cold plate. When it cools it should be very much like a piece of hard india rubber, flexible and elastic. Should it not be so, but brittle, then more "kidney oil" is to be added until the proper consistency is obtained. Having obtained the proper proportions I melt the said materials in a tank bringing them to the boiling state, when I add, in the relative proportions of one gallon of the resinous liquid to about one half of one cubic foot of fiber, fibrous substances, such as hay, straw, wire grass, reeds, briers, weeds, and such like, having first prepared the same by reducing them to uniformity and small diameter by passing them through picking machines. When the whole has been sufficiently saturated with the hot resinous liquid I mingle with the said mass powdered peat, and other finely ground substances, named below, until the composition assumes the consistency desired.

To obtain the powdered peat I first dry what is dug out of the bog so that all moisture is evaporated, and then I reduce the dry matter to a fine powder.

"Kidney-oil" and "soft pitch" are terms used by rosin oil distillers, and are well understood among them. When the gum turpentine, which is obtained from the pitch pine tree, is distilled the result is spirits of turpentine and rosin. When rosin is distilled the result is "rosin oil," or "grease oil," and "soft pitch." Rosin oil may be distilled many times with same results. Boil "rosin oil" and the result is "kidney-oil."

The "kidney-oil," which I use, is of the consistency of a heavy sirup in the winter time when it is cold, and its color is the amber color of rosin. I find by actual experience that the above stated combination of "kidney-oil," rosin, and "soft pitch," produces a gum that does not become hard and brittle, but maintains an elastic, springy, and tenacious condition under all usual temperatures. It does not dry nor crumble, and in its application to the fibers named it binds them together and preserves them against decay.

The fault with pitch, bitumen, coal-tar, and similar substances commonly used for street pavement, is that under the shock and traffic of the street they break and powder, leaving the fibers unprotected from moisture, in consequence of which they become loosened, crumble and decay.

Rosin, rosin-oil, pine-tar, and pitch, have heretofore been used in the construction of pavements in combination with coal-tar, bitumen, asphalt, and other mineral matters, including broken stone, gravel, and sand, but, as far as my knowledge goes, never in combination with vegetable fibers, or peat, for that purpose. Moreover, I use, in addition, what is known as "kidney-oil," which, as stated in the foregoing, is rosin-oil boiled. By this process all, or nearly all, volatile matters have been expelled, and the residuum is a non-drying oily gum. I use it as the base of my resinous compound, and I cannot find that it has heretofore been used for pavements.

Where vegetable fibers, such as straw, grasses, grain-stalks, reeds, &c., are, or have been, used in street pavements, they have been laid down without any preservation, or preparation against decay, and have been allowed to be pressed and wrought into the dust and clay of the street by the traffic, until they have become a homogeneous mass, and on the whole an admirable pavement; or they have been placed without any treatment to preserve them under a concrete mineral pavement, in which position they act as a cushion or pad to receive the shock of the traffic. In this case they do not become united with the pavement above, but are carefully separated by means taken to prevent that result.

Figure 2:

Referring to the drawings, Figure 1 is an illustration of the blocks into which I mold the above plastic composition. Fig. 2 is a section of a road-bed showing said blocks in position.

I am aware that the shape (conic frustum) is old, and has been the subject of patents on stone pavements. Consequently I do not claim it.

It will be observed that my blocks consist of three distinct layers. These layers consist of three different degrees of density. The lower layer A is the most dense of the three. It acquires this character by having added to the composition described above a quantity of hydraulic cement and ground clay, rock, gravel, or sand, which has the effect of greatly stiffening this portion of my block. This rigidity is very desirable as it furnishes a strong and proper base for the two overlying layers B and C. Layer B, which is preferably thicker than the others, is composed entirely of the said plastic composition without any admixture of cement or other substances, while layer C has added to it a quantity of cement and other mineral substances, but much less than what is mixed into layer A. Each of these layers is compounded in separate puddling tanks and are placed in molds while hot, and are subjected to pressure which compacts them into one solid block. The effect of this combination is to give to the pavement, when in position upon the roadway or street, great durability combined with much elasticity, the middle layer B furnishing the latter quality principally, while the top layer C is of sufficient density to withstand the wear and tear of the traffic and the indentation of the wheels of vehicles and hoofs of horses. It is impervious to moisture because of the resinous materials used in its composition.

I form my blocks in the shape preferably shown in the drawings, that is with a slight taper, in order that they may fit into one another when placed upon the roadway. When the blocks are laid side by side upon the street I cement them together by pouring into the crevices a solution of my resinous material to which I add more or less powdered peat and cement and I then tamp the whole together until it is one compact sheet from curb-stone to curb-stone.

My plastic composition may be laid down upon the roadway without the preliminary process of forming it into blocks, and when it has been molded into shape by being tamped it becomes compact and concrete and makes a dustless and durable country road.

My blocks are preferably eighteen inches square upon their face, and from six to seven inches in thickness, the middle layer B being about one half of the thickness of the whole.

I am aware that grasses, weeds, briers, straw, and other vegetable fibers have been used in plastic compositions; also that cement, clay, sand, land-plaster and other mineral matters have been constituent parts of such compounds; also that coal-tar and bitumen have also been employed in the same. None of these do I claim, but

I claim and desire to secure by Letters Patent of the United States—

1. In the manufacture of pavements, composed in part of vegetable substances, a gummy composition, having the qualities of a fixed or non-drying oil, consisting of soft-pitch, kidney-oil, and rosin, in about the proportions specified herein, and treated in the manner substantially as described.

2. A plastic pavement composed of vegetable fibers saturated with a composition of soft-pitch, kidney-oil, and rosin, and filled with powdered peat, cement, and mineral matter ground fine, the whole being compacted together under suitable pressure, substantially as described.

3. Paving blocks composed of the plastic composition herein described, having for its ingredients soft pitch, kidney oil, rosin, and vegetable fiber, each block consisting of three distinct layers of different densities, arranged and compressed together, to combine durability, elasticity, and a proper surface finish, substantially as described.

JOSEPH H. AMIES.

Witnesses:
J. A. S. WILSON,
ALFRED DARRACH.